United States Patent [19]
Wiggins

[11] Patent Number: 4,997,166
[45] Date of Patent: Mar. 5, 1991

[54] SILVER RECOVERY SYSTEM

[75] Inventor: Otis K. Wiggins, Carolina Beach, N.C.

[73] Assignee: Envirosave USA, Inc., Carolina Beach, N.C.

[21] Appl. No.: 543,536

[22] Filed: Jun. 26, 1990

[51] Int. Cl.⁵ .............................................. C22B 3/02
[52] U.S. Cl. ..................................... 266/170; 75/713; 75/733
[58] Field of Search ................... 75/713, 733; 266/170

[56] References Cited

U.S. PATENT DOCUMENTS

| | | | |
|---|---|---|---|
| 2,905,323 | 9/1959 | Megesi | 75/713 |
| 4,842,644 | 6/1989 | Senff | 75/713 |
| 4,854,552 | 8/1989 | Williams | 75/713 |

Primary Examiner—Melvyn J. Andrews
Attorney, Agent, or Firm—Olive & Olive

[57] ABSTRACT

A sealed, pressurized system for processing silver bearing solutions, such as photographic solutions, for the purpose of removing the silver comprises a series of interconnected sealed containers each of which contains several spaced apart reels or masses of steel wool through which the silver bearing solution is slowly pumped under pressure and intermittently.

4 Claims, 1 Drawing Sheet

SILVER RECOVERY SYSTEM

BACKGROUND OF INVENTION

1. Field of the Invention

The invention relates to a system for recovering silver from spent, waste photographic processing fluids.

2. Background of the Invention

It has been known to pass spent, waste silver halide photographic processing fluids by gravity flow through a single mass or so-called reel of steel wool in a container in the presence of a metal salt. A single mass of steel wool however tends to "channel" meaning the solution forces a clear path through the steel wool. Such a system is described in U.S. Pat. No. 4,740,244. Experiments directed toward improving the efficiency of silver removal appear to have been directed more to matters related to the amount of salt, the kind of salt and like considerations than to matters related to the steel wool and the flow. The present invention in contrast is directed to improving the efficiency by a new and novel arrangement of the steel wool in a sealed, pressurized system.

SUMMARY OF THE INVENTION

A silver recovery system according to the invention comprises a storage tank for storing the photographic processing fluid to be processed and a group of sealed containers each of which has a fluid inlet and outlet and between the inlet and outlet and within the container, a selected number of vertically spaced reels of steel wool. The containers are connected in series and a pump located between the storage tank and the first container forces the spent, waste processing fluid through each of the containers in succession as a pressurized, sealed system. The purified fluid from which the silver has been removed is discharged from the outlet of the last container in the series. A metal salt may be employed in each container as taught by the referred to patent. However, substantially improved results have been achieved primarily because of the new arrangement of the steel wool within the containers and the establishment of a pressurized sealed system in which the gases are contained and not allowed to escape into the environment.

DESCRIPTION OF PREFERRED EMBODIMENT

Figure 1:
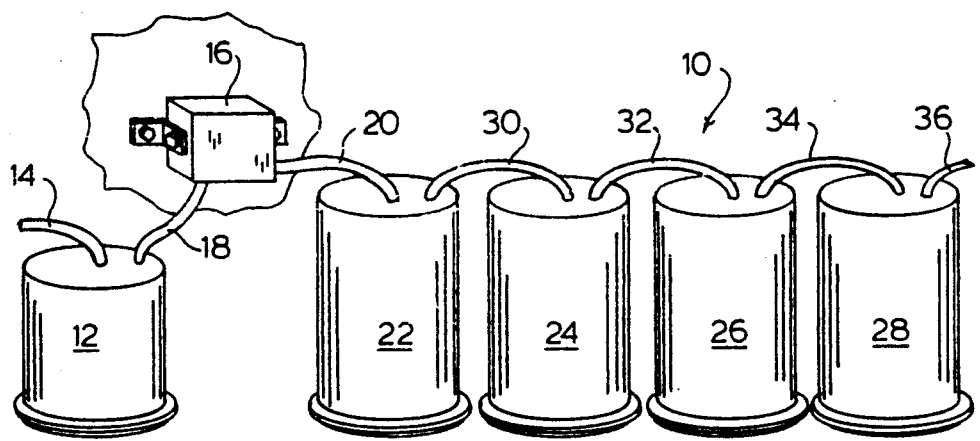
FIG. 1 is a schematic diagram of a silver recovery system according to the invention.
Figure 3:
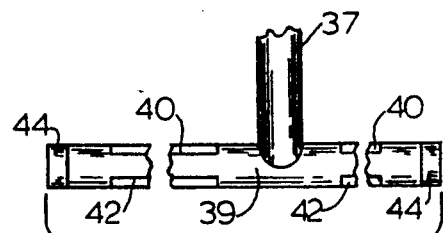
FIG. 3 is an enlarged, fragmentary side elevation view of the fluid distribution pipe shown in FIG. 2.

Making reference to the drawings, the silver recovery system 10 of the invention comprises a storage tank 12 into which by means of intake line 14 there is fed the waste, spent photographic processing fluid from which silver is to be recovered. An electrically energized pump 16 provided with means for timed intermittent operation draws the waste, spent fluid from storage tank 12 through suction line 18 and discharges such fluid through line 20 to the first of a series of sealed containers 22, 24, 26 and 28 of, for example, ten gallon capacity each interconnected in series through lines 30, 32 and 34 so as to provide a continuous pressurized flow path through the containers. Discharge to a municipal sewer line or to a further stage of treatment is made through discharge line 36 which constitutes the outlet of the last container 28.

The invention is primarily directed both to the establishment of a sealed pressurized system and to the internal arrangement of plural reels of steel wool in each of plural containers.

With regard to establishing the pressurized system of the invention, it has been found that a pump suitable for the purposes of pump 16 is the Dolphin series metering pump made by Pulsafeeder Company of Punta Gorda, Fla. and which is available in a number of feed rates and for timed intermittent operation suitable to the invention's requirements.

Figure 2:
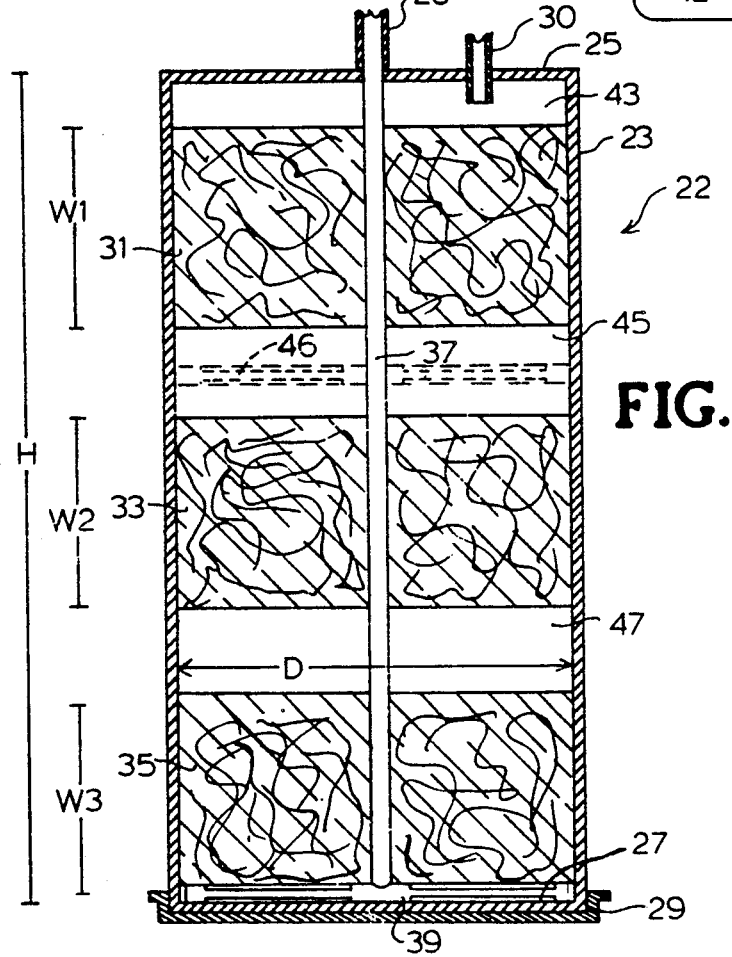
FIG. 2 is a sectional elevation view taken through one of the containers to illustrate how the reels of steel wool are arranged according to the invention.

Special reference is next made to FIG. 2 in which the construction of the sealed container 22 is illustrated, it being understood that containers 24, 26 and 28 are of similar construction. Container 22 as well as all of the illustrated pump and pipe components placed in direct contact with the fluid being processed are preferably made of a plastic which is inert to the fluid. However, other materials of similar character may be employed.

Container 22 is generally cylindrical in form and includes a side wall 23, a top wall 25 and a bottom wall 27. While illustrated with bottom wall 27 resting in a support cap 29 and with all of the walls forming a completely sealed unit, it is recognized that cap 29 and bottom wall 27 could be formed as a screw-on or other form of removeable cap. Of particular significance to the present invention is that instead of having a single reel of steel wool as in prior art silver recovery systems, there is provided a plurality of vertically spaced cylindrical reels of steel wool 31, 33 and 35. Steel wool reels 31, 33 and 35 surround the internally placed vertical inlet tube 37 connected to and forming an extension of the previously referred to pipe 20 extending between pump 16 and container 22. Inlet tube 37 terminates slightly above the bottom wall 27 where it joins a fluid spreader tube 39 oriented perpendicular to inlet tube 37. Spreader tube 39 is formed with upper slits 40 and lower slits 42. Caps 44 seal the ends of tube 39. Incoming pressurized fluid received through inlet tube 37 is able to disperse through slits 40, 42 of tube 39 below the bottommost steel wool reel 35 and work itself upward through each of the steel wool reels 35, 33 and 31 to be discharged through the discharge outlet connected to and forming an extension of the previously referred to pipe 30 which connects containers 22 and 24. A shallow vertically extending space 43 is provided above the uppermost steel wool reel 31 to facilitate seepage and flow of the fluid leaving the upper surface of steel wool reel 31 to the discharge pipe. Steel wool reel 31 is separated from steel wool reel 33 by vertically extending space 45 and steel wool reel 33 is separated from steel wool reel 35 by vertically extending space 47.

An alternative arrangement provides for an additional fluid spreader tube 46, shown in dashed lines, of the same construction as spreader tube 39 to be located between steel wool reels 31 and 33.

In one embodiment, the container dimension D was approximately 10", the dimension H was approximately 24", the reel separation spaces 45, 47 were approximately 3" each and the reel thickness W-1, W-2 and W-3 were approximately 6" each. The containers were operated at approximately two pounds of pressure and the intermittent and preferably slow flow rate was not allowed to exceed five gallons per hour. 4 minutes on and 2 minutes off was found suitable in one experiment. The system was found useful with silver containing black and white fixer, color bleach, wastewater and combinations of such fluids. Experiments were run in which the system was primed with a copper salt solution and substantial improvement was found in the amount of silver recovered with such improvement being attributable primarily to the novel arrangement of the reels of steel wool, to the use of a sealed pressurized system having plural sealed pressurized containers in series, and to the internal flow arrangement within each container aimed at minimizing channelling.

In summary, the advantages of both a more efficent, pressurized and substantially sealed system have been achieved. Additionally, the channelling problem experienced with a single reel or mass of steel wool has been minimized through use of the new system.

I claim:

1. A sealed, pressurized system for recovering silver from a silver bearing solution, comprising:
    (a) a storage vessel for storing a quantity of unprocessed silver bearing solution from which silver is to be recovered;
    (b) pumping means including an electrically energized pump having an inlet connected to said storage vessel and a discharge outlet, and means for energizing said pump to cause said unprocessed silver bearing solution to be pumped from said vessel to said discharge outlet; and
    (c) silver recovery means comprising a series of sealed containers including a first and successive containers each having an inlet and outlet, said pump discharge outlet being connected to the inlet of the first container in the series and the inlets and outlets of the remaining containers being interconnected such that a continuous sealed, pressurized flow path is established which extends from the pump discharge outlet through each of the containers to the outlet of the last container in the series where the solution from which the silver has been recovered is discharged; and
    (d) each of said containers enclosing a plurality of axially aligned spaced apart reels of steel wool and having an inlet tube extending through the reels and fluid distribution means to a discharge end and arranged such that silver bearing solution received through the inlet of the container is forced to travel in one direction through and be discharged from the inlet tube and then be forced to travel in an opposite direction through each of the reels in sequence before being discharged through the container's outlet whereby to cause silver being removed to be trapped in said reels.

2. A sealed, pressurized system for recovering silver from a silver bearing solution as claimed in claim 1, wherein said series of containers comprise four vertical, cylindrical containers, said reels of steel wool comprise three vertically spaced cylindrical reels of steel wool and said inlet tube extends vertically from the containers inlet centrally through each of the reels.

3. A sealed, pressurized system for recovering silver from a silver bearing solution as claimed in claim 1 wherein said means for energizing said pump causes said pump to pump on an intermittent schedule.

4. A sealed, pressurized system for recovering silver from a silver bearing solution as claimed in claim 1 wherein said fluid distribution means includes a fluid distribution tube fixed in perpendicular relation to the discharge end of said inlet tube and having openings for discharging the fluid therefrom.

* * * * *